United States Patent
Srinivasan et al.

(10) Patent No.: US 10,097,457 B1
(45) Date of Patent: Oct. 9, 2018

(54) RESOLVING A MISMATCH AMONG CONTROL PLANE PARAMETER VALUES RECEIVED FROM MULTIPLE ROUTING CONTROL DEVICES

(71) Applicant: Juniper Networks, Inc., Sunnyvale, CA (US)

(72) Inventors: Shriram Srinivasan, Bangalore (IN); Rajeevalochan Ramaswamy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 181 days.

(21) Appl. No.: 14/979,986

(22) Filed: Dec. 28, 2015

(51) Int. Cl.
*H04L 12/741* (2013.01)
(52) U.S. Cl.
CPC .................... *H04L 45/745* (2013.01)
(58) Field of Classification Search
CPC ....... H04L 45/745; H04L 45/38; H04L 45/54; H04L 45/70; H04L 63/20; H04L 41/0893; H04L 41/0816; H04L 49/70; H04L 41/0873; H04W 45/04; H04M 15/66
See application file for complete search history.

(56) References Cited

U.S. PATENT DOCUMENTS

| | | | | |
|---|---|---|---|---|
| 9,807,051 B1 * | 10/2017 | Mohanty | ............. | H04L 61/2046 |
| 2012/0226799 A1 * | 9/2012 | Kapur | .................. | G06F 9/5044 709/224 |
| 2013/0250815 A1 * | 9/2013 | Singh | ...................... | H04L 45/18 370/256 |
| 2014/0075519 A1 * | 3/2014 | Porras | ..................... | H04L 63/20 726/4 |
| 2014/0123211 A1 * | 5/2014 | Wanser | ................... | H04L 63/10 726/1 |
| 2015/0010012 A1 * | 1/2015 | Koponen | ............ | H04L 41/0873 370/411 |
| 2017/0093914 A1 * | 3/2017 | Venkataramanan | .... | H04L 63/20 |
| 2017/0142010 A1 * | 5/2017 | Mathew | ................ | H04L 45/745 |

OTHER PUBLICATIONS

Institute of Electrical and Electronics Engineers, "IEEE Std 802.1BR-2012: Virtual Bridged Local Area Networks—Bridge Port Extension," http://standards.ieee.org/getieee802/download/802.1BR-2012.pdf, Jul. 16, 2012, 135 pages.

* cited by examiner

*Primary Examiner* — Paul H Masur
*Assistant Examiner* — Michael K Phillips
(74) *Attorney, Agent, or Firm* — Harrity & Harrity, LLP

(57) ABSTRACT

A network device may receive, from a first control device, a first value for a control plane parameter used to configure a control plane associated with the network device. The network device may receive, from a second control device, a second value for the control plane parameter. The second value may be different from the first value. The network device may determine that the second value is different from the first value. The network device may determine a rule, associated with the control plane parameter, based on determining that the second value is different from the first value. The network device may determine, based on the rule, a third value for the control plane parameter. The network device may transmit, to another network device, a packet that includes the third value for the control plane parameter.

20 Claims, 4 Drawing Sheets

US 10,097,457 B1

RESOLVING A MISMATCH AMONG CONTROL PLANE PARAMETER VALUES RECEIVED FROM MULTIPLE ROUTING CONTROL DEVICES

BACKGROUND

A router may refer to a network device that routes and/or forwards packets between computer networks and/or network devices. A packet is typically forwarded from one router to another through the networks that constitute the Internet until the packet reaches a destination device. When a packet is received by a router, the router may read address information included in the packet to determine the destination for the packet. Then, using information stored in a routing table or indicated by a routing policy, the router may direct the packet toward the destination.

SUMMARY

According to some possible implementations, a routing system may include a first control device that provides a first value, for a control plane parameter, to a network device. The routing system may include a second control device that provides a second value, for the control plane parameter, to the network device. The second value may be different from the first value. The routing system may include the network device. The network device may receive, from the first control device, the first value for the control plane parameter. The network device may receive, from the second control device, the second value for the control plane parameter. The network device may determine that the first value is different from the second value. The network device may identify a rule for determining a third value for the control plane parameter based on determining that the first value is different from the second value. The network device may determine, based on applying the rule, the third value for the control plane parameter. The network device may transmit, to another network device, a packet that includes the third value for the control plane parameter.

According to some possible implementations, a network device may include one or more processors to receive, from a first control device, a first value for a control plane parameter used to configure a control plane associated with the network device. The one or more processors may receive, from a second control device, a second value for the control plane parameter. The second value may be different from the first value. The one or more processors may determine that the second value is different from the first value. The one or more processors may determine a rule, associated with the control plane parameter, based on determining that the second value is different from the first value. The one or more processors may determine, based on the rule, a third value for the control plane parameter. The one or more processors may transmit, to another network device, a packet that includes the third value for the control plane parameter.

According to some possible implementations, a method may include receiving, by a network device and from a first control device, a first value for a control plane parameter used to configure a control plane associated with the network device and a peer device. The method may include receiving, by the network device and from a second control device, a second value for the control plane parameter used to configure the control plane associated with the network device and the peer device. The second value may be different from the first value. The method may include determining, by the network device, that the first value and the second value are different. The method may include identifying, by the network device and based on determining that the first value and the second value are different, a rule for determining a third value for the control plane parameter used to configure the control plane associated with the network device and the peer device. The method may include determining, by the network device and based on the rule, the third value for the control plane parameter. The method may include transmitting, by the network device and to the peer device, a packet that includes the third value for the control plane parameter.

DETAILED DESCRIPTION

The following detailed description of example implementations refers to the accompanying drawings. The same reference numbers in different drawings may identify the same or similar elements.

A network device, such as a router, may be controlled by multiple control devices (e.g., routing control devices) that provide control plane information for the network device. For example, the network device may receive, from multiple control devices, control plane parameters for a single port of the network device. This configuration may reduce networking costs because a network service provider may deploy a relatively large quantity of less expensive network devices and a relatively small quantity of more expensive control devices to manage multiple network devices. Furthermore, this configuration may provide redundancy because a first control device may manage a network device if a second control device can no longer manage the network device (e.g., due to an error, a malfunction, a shutdown, a reboot, etc.).

However, this configuration introduces the possibility that a network device may receive a first value for a control plane parameter from a first control device, and may receive a second, different, value for the control plane parameter from a second control device, resulting in a configuration mismatch. Such configuration mismatches may result in networking errors, data loss, increased latency, network inefficiencies, or the like. Implementations described herein permit a network device to resolve mismatches among control plane parameter values received from multiple routing control devices, which reduces networking errors, data loss, latency, network inefficiencies, or the like.

Figure 1:
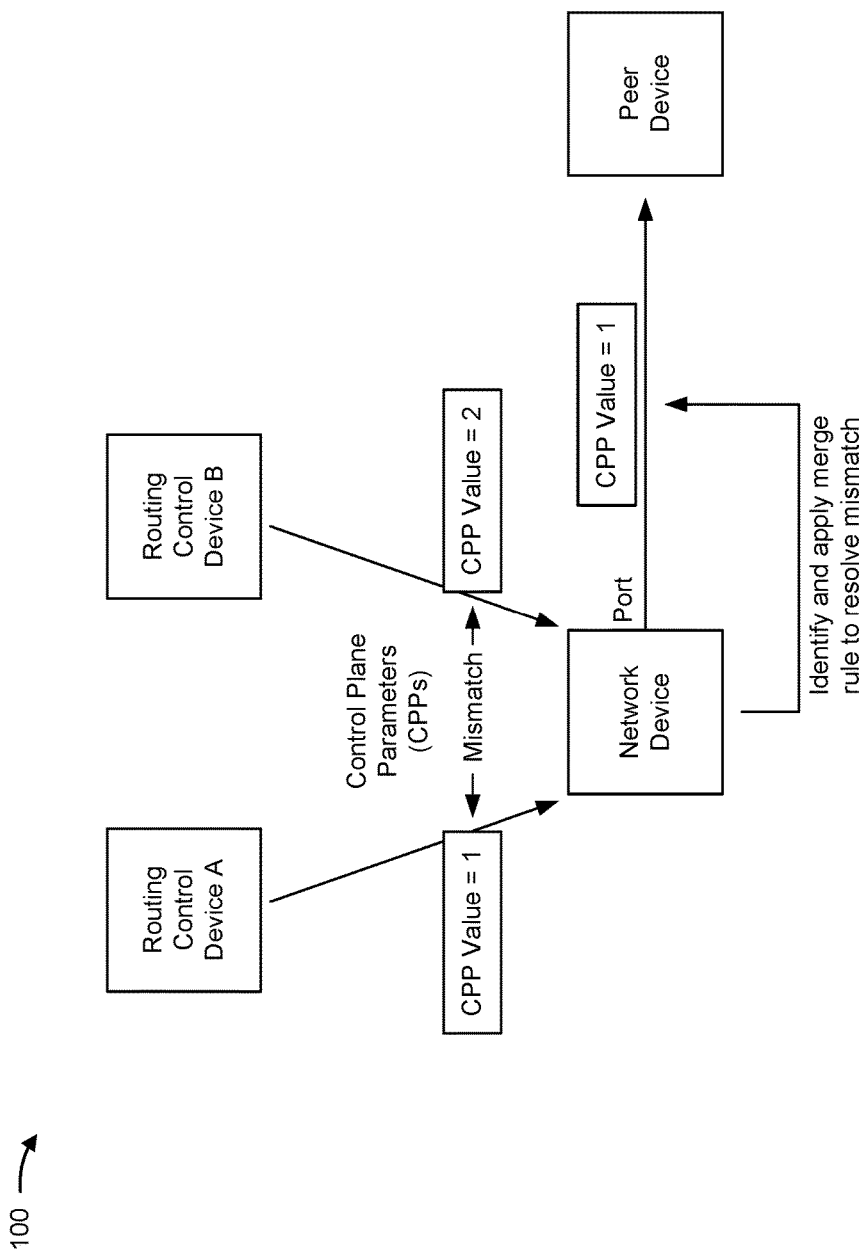
FIG. 1 is a diagram of an overview of an example implementation described herein.

FIG. 1 is a diagram of an overview of an example implementation 100 described herein. As shown in FIG. 1, a network device (e.g., a router, a switch, etc.) may receive different control plane parameter values from different routing control devices (e.g., routing engines). For example, and as shown, assume that the network device receives a control plane parameter (CPP) value of 1 from a first routing control device, shown as routing control device A. Further, assume that the network device receives a control plane parameter value of 2 from a second routing control device, shown as routing control device B. Assume that the different values (1 and 2) are values for the same control plane parameter, which may be used to configure a port of the network device.

In this case, the network device determines that there is a mismatch between the control plane parameter values because the first value of 1 does not match the second value of 2. Based on determining that there is a mismatch between the control plane parameter values received from the different routing control devices, the network device identifies a merge rule associated with the control plane parameter. For example, the network device may store a set of merge rules, and may identify a merge rule based on the control plane parameter, a protocol associated with the control plane parameter, a layer associated with the control plane parameter (e.g., a link layer, a network layer, etc.), or the like. The network device may apply the identified merge rule to resolve the mismatch. Different types of merge rules are described in more detail elsewhere herein.

For the purposes of FIG. 1, assume that the merge rule indicates that the network device is to select the control plane parameter value from routing control device A. As a result, the network device sets the control plane parameter value to 1. In some implementations, the network device may use the resolved control plane parameter value to configure the network device (e.g., to configure a port of the network device). Additionally, or alternatively, the network device may provide the resolved control plane parameter value to a peer device (e.g., another network device). The peer device may use the resolved control plane parameter value to configure communications with the network device.

In this way, multiple routing control devices may be used to provide control plane information for a network device, thereby providing redundancy and increasing network reliability, while reducing errors when the network device receives conflicting information from the routing control devices. Furthermore, a peer device may communicate with the network device without requiring a special configuration to handle configuration mismatches, thereby conserving computing resources (e.g., memory resources, processing resources, network resources, etc.).

Figure 2:
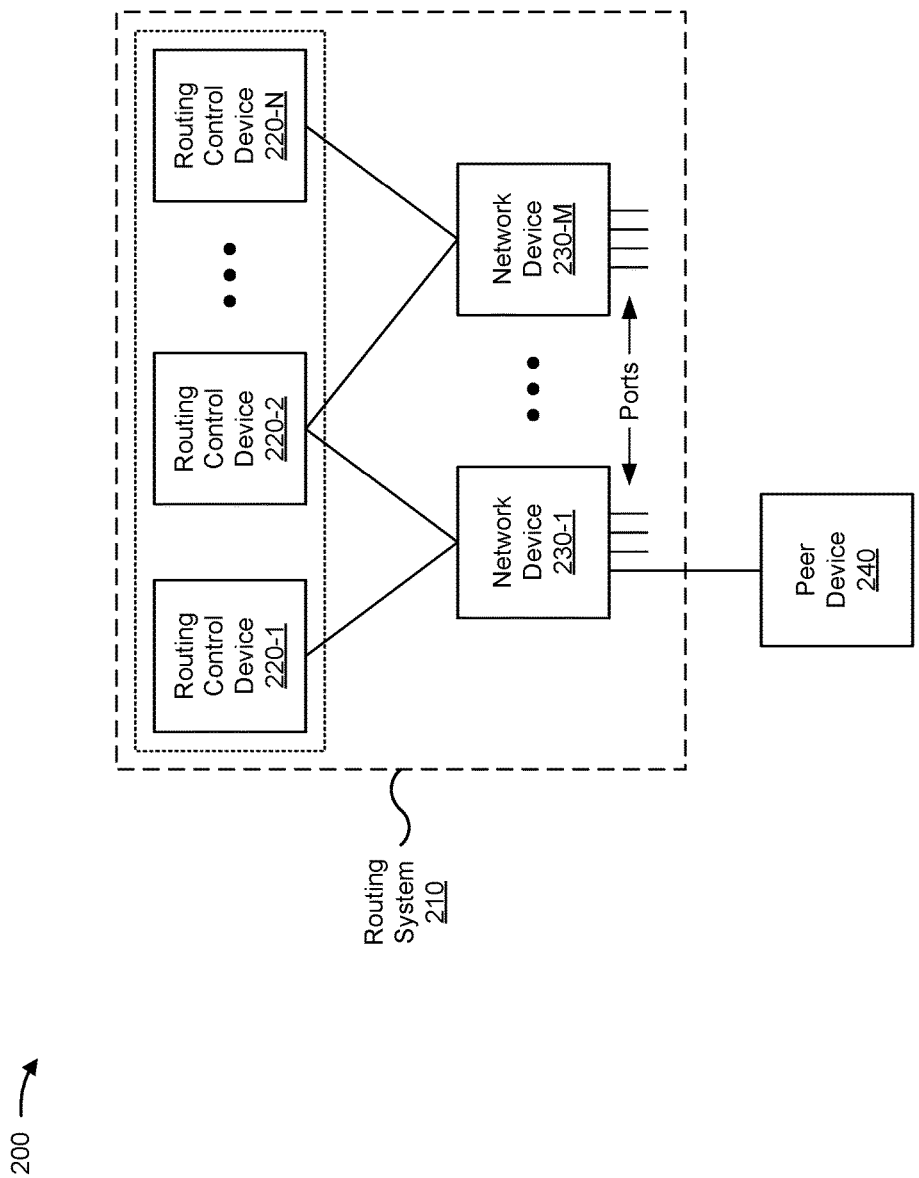
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a routing system 210, which may include a set of routing control devices 220-1 through 220-N(N≥1) (hereinafter referred to collectively as "routing control devices 220," and individually as "routing control device 220") and a set of network devices 230-1 through 230-M (M≥1) (hereinafter referred to collectively as "network devices 230," and individually as "network device 230"). Furthermore, environment 200 may include a peer device 240. Devices of environment 200 may interconnect via wired connections, wireless connections, or a combination of wired and wireless connections.

Routing system 210 may include a set of routing control devices 220 and a set of network devices 230. One or more routing control devices 220 may be interconnected with one or more network devices 230, and may provide control plane information (e.g., values for control plane parameters) to control a manner in which network device 230 routes and/or forwards information (e.g., packets). For example, a single network device 230 may receive control plane information from multiple routing control devices 220 (e.g., two routing control devices 220, three routing control devices 220, etc.). Additionally, or alternatively, a single routing control device 220 may provide control plane information to multiple network devices 230. In some implementations, two or more devices of routing system 210 may be located proximate to one another (e.g., in a same chassis, in a same rack, in a same data center, in a same geographic location, etc.). In some implementations, two or more devices of routing system 210 may be located remote from one another (e.g., in different chassis, in different racks, in different data centers, in different geographic locations, etc.). In some implementations, the quantity of network devices 230 included in routing system 210 may be greater than the quantity of routing control devices 220 included in routing system 210.

Routing control device 220 may include one or more devices (e.g., one or more traffic transfer devices) capable of processing and/or transferring traffic between endpoint devices. For example, routing control device 220 may include a router, a routing engine, a switch, a gateway, a firewall, a hub, a bridge, a reverse proxy, a server (e.g., a proxy server, a server executing a virtual machine, etc.), a security device, an intrusion detection device, a load balancer, or a similar device. In some implementations, routing control device 220 may perform control plane functions for one or more network devices 230. For example, routing control device 220 may provide control plane information (e.g., a value for a control plane parameter) to network device 230.

Network device 230 may include one or more devices (e.g., one or more traffic transfer devices) capable of processing and transferring traffic between endpoint devices. For example, network device 230 may include a router, a routing engine, a switch, a gateway, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar device. In some implementations, network device 230 may receive control plane information from multiple routing control devices 220. Network device 230 may include one or more ports, and may receive control plane information for a particular port (e.g., a single port) from multiple routing control devices 220.

Peer device 240 may include one or more devices capable of receiving and/or providing network traffic. For example, peer device 240 may include a traffic transfer device, such as a router, a routing engine, a switch, a gateway, a firewall, a hub, a bridge, a reverse proxy, a server (e.g., a proxy server, a server executing a virtual machine, etc.), a security device, an intrusion detection device, a load balancer, or a similar device. Additionally, or alternatively, peer device 240 may include an endpoint device that is a source or a destination for network traffic. For example, peer device 240 may include a computer or a similar device. Peer device 240 may receive network traffic from and/or may provide network traffic to network device 230. Network device 230 may manage conflicting control plane information from multiple routing control devices 220 so that peer device 240 receives a single configuration to manage a control plane.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
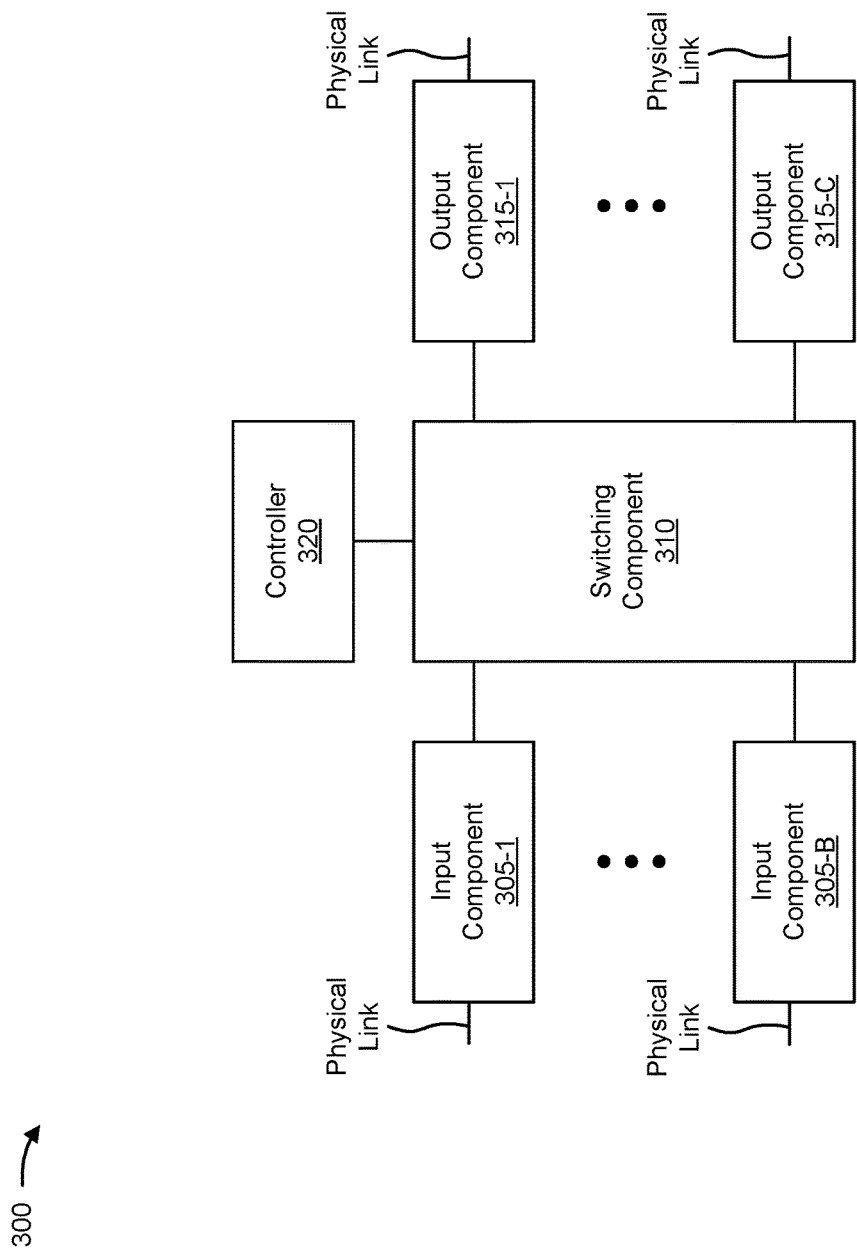
FIG. 3 is a diagram of example components of one or more devices of FIG. 2.

FIG. 3 is a diagram of example components of a device 300. Device 300 may correspond to routing system 210, routing control device 220, network device 230, and/or peer device 240. In some implementations, routing system 210, routing control device 220, network device 230, and/or peer device 240 may include one or more devices 300 and/or one or more components of device 300. As shown in FIG. 3, device 300 may include a set of input components 305, a switching component 310, a set of output components 315, and a controller 320. In some implementations, components of devices 300 may interconnect via wired connections.

Input component 305 may be a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a field-programmable gate array (FPGA), an application-specific integrated circuit (ASIC), and/or another type of processor that can interpret and/or execute instructions. Controller 320 is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
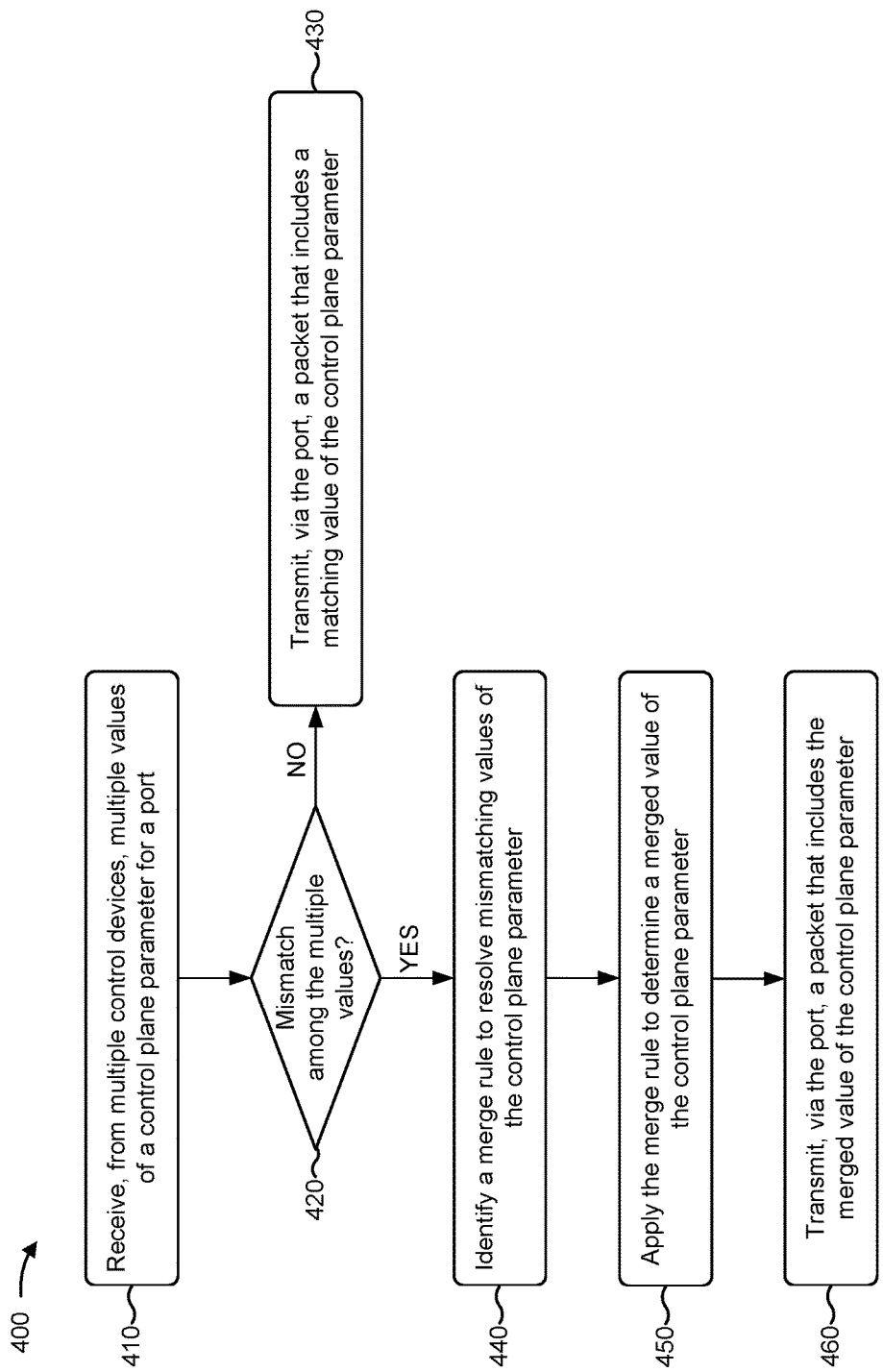
FIG. 4 is a flow chart of an example process for resolving a mismatch among control plane parameter values received from multiple routing control devices.

FIG. 4 is a flow chart of an example process 400 for resolving a mismatch among control plane parameter values received from multiple routing control devices. In some implementations, one or more process blocks of FIG. 4 may be performed by network device 230. In some implementations, one or more process blocks of FIG. 4 may be performed by another device or a group of devices separate from or including network device 230, such as routing system 210, routing control device 220, and/or peer device 240.

As shown in FIG. 4, process 400 may include receiving, from multiple control devices, multiple values of a control plane parameter for a port (block 410). For example, network device 230 may receive control plane information from multiple routing control devices 220. The control plane information may include, for example, information that controls a manner in which packets are routed (e.g., by network device 230). For example, the control plane information may include a value for a control plane parameter. A control plane parameter may refer to a configurable parameter associated with managing a control plane, and a control plane parameter value may refer to a value for the control plane parameter. For example, the control plane parameter may be represented by a field of a data structure (e.g., a packet), and the control plane parameter value may be a value included in the field.

In some implementations, the control plane parameter may be associated with a particular protocol (e.g., a routing protocol), such as a link aggregation control protocol (LACP), a link layer discovery protocol (LLDP), an address resolution protocol (ARP), a virtual router redundancy protocol (VRRP), a dynamic host configuration protocol (DHCP), a spanning tree protocol (STP), or the like. Additionally, or alternatively, the control plane parameter may be associated with a particular computer networking layer, such as a physical layer (e.g., layer 1), a link layer (e.g., layer 2), a network layer (e.g., layer 3), a transport layer (e.g., layer 4), or the like. In some implementations, the control plane parameter may be associated with a port of network device 230.

In some implementations, multiple routing control devices 220 may manage and/or control network device 230 (e.g., to provide redundancy). In this case, multiple routing control devices 220 may provide control plane information to network device 230. For example, network device 230 may receive multiple values, for a control plane parameter, from different routing control devices 220 (e.g., from two or more routing control device 220). In other words, network device 230 may receive a first value for a control plane parameter from a first routing control device 220, may receive a second value for the control plane parameter from a second routing control device 220, etc. In some cases, the multiple values may be the same value. In some cases, the multiple values may be different values.

When network device 230 receives two or more different values for the same control plane parameter, then network device 230 may resolve this difference, as described in more detail below. In this way, multiple routing control devices 220 may be used to manage network device 230, providing redundancy, and network device 230 may handle mismatching control plane parameter values received from the multiple routing control devices 220, thereby reducing network errors.

As further shown in FIG. 4, process 400 may include determining whether there is a mismatch among the multiple values (block 420). For example, network device 230 may determine whether two or more values, received by network device 230 for the same control plane parameter, are different (e.g., do not match). In some implementations, network device 230 may compare the received values to determine whether the received values for a control plane parameter are the same or different. In other words, network device 230 may compare a first control plane parameter value, received from a first routing control device 220, and a second control plane parameter value received from a second routing control device 220. If network device 230 is controlled by more than two routing control devices 220, then network device 230 may compare all of the received control plane parameter values to determine whether all of the values match.

In some cases, the received control plane parameter values may not match because routing control devices 220 may not be synchronized. Additionally, or alternatively, one or more routing control devices 220 may not have finished processing information (e.g., packets), may have been rebooted, or the like. Thus, network device 230 may analyze multiple control plane parameter values, received from different routing control devices 220, to determine whether there is a mismatch among the multiple control plane parameter values.

As further shown in FIG. 4, if there is not a mismatch among the multiple values (block 420—NO), then process 400 may include transmitting, via the port, a packet that includes a matching value of the control plane parameter (block 430). For example, if network device 230 determines that the multiple control plane parameter values, received from different routing control devices 220, match one another, then network device 230 may use the matching value to configure the control plane (e.g., for a port of network device 230). Additionally, or alternatively, network device 230 may transmit the matching value to peer device 240, and peer device 240 may configure a control plane using the matching value (e.g., may configure a port of peer device 240). The matching value may refer to any one of the multiple control plane parameters that match one another.

In some implementations, network device 230 may include the matching value in a field, of a packet, that corresponds to the control plane parameter, and may transmit the packet to peer device 240. In some implementations, network device 230 may transmit the packet to peer device 240 via a port that corresponds to the control plane parameter (e.g., a port to be configured based on the control plane parameter value). In this way, multiple routing control devices 220 may be used to manage network device 230, providing redundancy, and network device 230 may efficiently process matching control plane parameter values received from the multiple routing control devices 220, thereby conserving computing resources.

As further shown in FIG. 4, if there is a mismatch among the multiple values (block 420—YES), then process 400 may include identifying a merge rule to resolve mismatching values of the control plane parameter (block 440). For example, network device 230 may receive and/or store a set of merge rules that indicate how to resolve mismatches among different control plane parameter values. A merge rule may be based on, for example, the control plane parameter, one or more received control plane parameter values, a protocol associated with the control plane parameter, a computer networking layer associated with the control plane parameter, or the like.

In some implementations, the merge rule may indicate that network device 230 is to select one of the received control plane parameter values. For example, the merge rule may designate a particular routing control device 220, and network device 230 may select the control plane parameter value received from the designated routing control device 220. In this way, if a particular routing control device 220 is known to be more reliable than other routing control device (s) 220, then the merge rule may designate the more reliable routing control device 220, thereby increasing the reliability of control plane configurations.

As another example, the merge rule may indicate an order of preference for multiple values that may be associated with a control plane parameter, and network device 230 may select a received control plane parameter value based on the order of preference (e.g., may select the most preferred control plane parameter value among the received control plane parameter values). In this way, if a particular control plane parameter value is known to be less problematic than other control plane parameter value(s), then the merge rule may prioritize less problematic control plane parameter values, thereby reducing errors associated with control plane configurations.

As an example, network device 230 may select an inferior parameter value (e.g., for a protocol, such as LACP), as compared to a superior parameter value (e.g., for the protocol), from the multiple received values. The inferior parameter value may represent an inferior state as compared to a superior state represented by the superior parameter value. In some cases, the inferior state may be a state that precedes the superior state in a state machine. In this way, network device 230 may ensure that all control devices 220 proceed to the same superior state before network device 230 transmits a control parameter value that represents the superior state for the control plane parameter.

As another example, network device 230 may receive one or more notifications associated with routing control device(s) 220. For example, network device 230 may receive a notification indicating that routing control device 220 is rebooting, indicating that routing control device 220 has shut down, indicating that routing control device 220 is malfunctioning, or otherwise indicating that routing control device 220 is unable to properly provide accurate control plane information to network device 230. In this case, the merge rule may specify that network device 230 is to use a control plane parameter value from a routing control device 230 other than the routing control device 230 associated with the notification. In some implementations, network device 230 may ignore control plane parameter values from routing control device 230 associated with the notification until another notification is received (e.g., indicating that an issue has been resolved), until a threshold amount of time has elapsed (e.g., since receiving the notification, since routing control device 230 experienced an issue, etc.), or the like. In this way, network device 230 may use a control plane parameter value from a more reliable routing control device 220, thereby increasing the reliability of control plane configurations.

As another example, the merge rule may indicate that network device 230 is to select a control plane parameter value received the greatest quantity of times. For example, assume that network device 230 receives three control plane parameter values from three different routing control devices 220. Further, assume that a value of 1 is received twice, and a value of 2 is received once. In this case, network device 230 may select the value of 1 to resolve the mismatch because the value of 1 appears the greatest quantity of times. In this way, network device 230 may select a control plane parameter value that is more likely to be correct because it is received from more routing control devices 220 as compared with another control plane parameter value. As another example, the merge rule may indicate that network device 230 is to randomly select one of the received control plane parameter values.

In some implementations, the merge rule may indicate that network device 230 is to use a control plane parameter value other than the received control plane parameter values. In this case, the merge rule may identify the control plane parameter value to be used (e.g., a default control plane parameter value). For example, if the control plane parameter is an optional parameter, then the merge rule may indicate that network device 230 is to use a null value for the control plane parameter. In this way, network device 230 may reduce errors by using a control plane parameter value that is known to be less problematic than other control plane parameter value(s).

As further shown in FIG. 4, process 400 may include applying the merge rule to determine a merged value of the control plane parameter (block 450), and transmitting, via the port, a packet that includes the merged value of the control plane parameter (block 460). For example, network device 230 may determine a merged value based on applying one or more merge rules, described above. A merged value may refer to a control plane parameter value determined based on applying the merge rule. For example, the merged value may be selected from the multiple control plane parameter values received by network device 230, or may be different from the control plane parameter values received by network device 230, as described above.

In some implementations, network device 230 may use the merged value to configure the control plane (e.g., for a port of network device 230). Additionally, or alternatively, network device 230 may transmit the merged value to peer device 240, and peer device 240 may configure a control plane using the matching value (e.g., may configure a port of peer device 240).

In some implementations, network device 230 may include the merged value in a field, of a packet, that corresponds to the control plane parameter, and may transmit the packet to peer device 240. In some implementations, network device 230 may transmit the packet to peer device 240 via a port that corresponds to the control plane parameter (e.g., a port to be configured based on the control plane parameter value). In this way, multiple routing control devices 220 may be used to manage network device 230, providing redundancy, and network device 230 may resolve mismatches among control plane parameter values received from the multiple routing control devices 220, thereby reducing network errors.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein permit a network device to resolve mismatches among control plane parameter values received from multiple routing control devices, which may reduce networking errors, data loss, latency, network inefficiencies, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, a packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A routing system, comprising:
    a first control device that provides a first value, for a control plane parameter, to a switch;
    a second control device that provides a second value, for the control plane parameter, to the switch,
        the second value being different from the first value; and
    the switch to:
        receive, from the first control device, the first value for the control plane parameter;
        receive, from the second control device, the second value for the control plane parameter;
        determine that the first value is different from the second value;
        identify a rule for determining a third value for the control plane parameter based on determining that the first value is different from the second value,
            the rule indicating that:
                the first value is to be selected based on a quantity of times that the first value is received is greater than a quantity of times that the second value is received, or
                the second value is to be selected based on the quantity of times that the second value is received is greater than the quantity of times that the first value is received;
        determine, based on applying the rule, the third value for the control plane parameter,
            the third value being one of the first value or the second value based on the quantity of times that the first value is received and the quantity of times that the second value is received; and
        transmit, to a network device, a packet that includes the third value for the control plane parameter.

2. The routing system of claim 1, where the packet is a first packet; and
    where the switch is further to:
        identify, based on the rule, a different value than the first value and the second value;
        set the different value as a fourth value for the control plane parameter; and
        transmit, to the network device, a second packet that includes the fourth value for the control plane parameter.

3. The routing system of claim 1, where the switch, when identifying the rule, is to:
    identify the rule based on the control plane parameter.

4. The routing system of claim 1, where the switch, when identifying the rule, is to:
    identify the rule based on a protocol associated with the control plane parameter.

5. The routing system of claim 1, where the switch, when identifying the rule, is to:
    identify the rule based on a computer networking layer associated with the control plane parameter.

6. The routing system of claim 1, where the switch is further to:
    configure a port of the switch using the third value for the control plane parameter.

7. The routing system of claim 6, where the switch, when transmitting the packet, is to:
    transmit the packet via the port.

8. A network device, comprising:
    a memory; and
    one or more processors to:
        receive, from a first control device, a first value for a control plane parameter used to configure a control plane associated with the network device;
        receive, from a second control device, a second value for the control plane parameter,
            the second value being different from the first value;
        determine that the second value is different from the first value;
        determine a rule, associated with the control plane parameter, based on determining that the second value is different from the first value,
            the rule indicating that:
                the first value is to be selected based on a quantity of times that the first value is received is greater than a quantity of times that the second value is received, or
                the second value is to be selected based on the quantity of times that the second value is received is greater than the quantity of times that the first value is received;
        determine, based on the rule, a third value for the control plane parameter,
            the third value being one of the first value or the second value based on the quantity of times that the first value is received and the quantity of times that the second value is received; and
        transmit, to another network device, a packet that includes the third value for the control plane parameter.

9. The network device of claim 8, where the packet is a first packet; and
    where the one or more processors are further to:
        determine a fourth value that is different from both the first value and the second value; and
        transmit a second packet that includes the fourth value for the control plane parameter.

10. The network device of claim 8, where the rule is a first rule;
    where a second rule indicates that the network device is to select control plane parameter values received from the first control device when there is a mismatch among control plane parameter values received from multiple control devices; and where the one or more processors, when determining the third value, are to:
    select the first value as the third value based on the second rule.
11. The network device of claim 8, where the rule indicates that the first value has a higher preference than the second value; and
where the one or more processors, when determining the third value, are to:
    select the first value as the third value based on the rule.
12. The network device of claim 8, where the one or more processors are further to:
receive a notification of an issue associated with the second control device; and
where the one or more processors, when determining the third value, are to:
    select the first value as the third value based on receiving the notification of the issue associated with the second control device.
13. The network device of claim 8, where the rule is a first rule;
where a second rule identifies a fourth value; and
where the one or more processors are further to:
    determine the fourth value for the control plane parameter based on the second rule.
14. The network device of claim 12, where the notification indicates that:
the second control device is rebooting;
the second control device has shut down;
the second control device has malfunctioned; or
the second control device is unable to provide accurate control plane information.
15. A method, comprising:
receiving, by a network device and from a first control device, a first value for a control plane parameter used to configure a control plane associated with the network device and a peer device;
receiving, by the network device and from a second control device, a second value for the control plane parameter used to configure the control plane associated with the network device and the peer device, the second value being different from the first value;
determining, by the network device, that the first value and the second value are different;
identifying, by the network device and based on determining that the first value and the second value are different, a rule for determining a third value for the control plane parameter used to configure the control plane associated with the network device and the peer device,
    the rule indicating that:
        the first value is to be selected based on a quantity of times that the first value is received is greater than a quantity of times that the second value is received, or
        the second value is to be selected based on the quantity of times that the second value is received is greater than the quantity of times that the first value is received;
determining, by the network device and based on the rule, the third value for the control plane parameter,
    the third value being one of the first value or the second value based on the quantity of times that the first value is received and the quantity of times that the second value is received; and
transmitting, by the network device and to the peer device, a packet that includes the third value for the control plane parameter.
16. The method of claim 15, where the packet is a first packet; and
where the method further comprises:
    determining a fourth value that is different from the first value and the second value; and
    transmitting a second packet that includes the fourth value for the control plane parameter.
17. The method of claim 15, further comprising:
configuring the control plane associated with the network device and the peer device based on the third value for the control plane parameter.
18. The method of claim 15, where transmitting the packet that includes the third value for the control plane parameter comprises:
transmitting an instruction for the peer device to configure the control plane associated with the network device and the peer device based on the third value for the control plane parameter.
19. The method of claim 15, where identifying the rule comprises:
identifying the rule based on at least one of:
    the control plane parameter,
    a protocol associated with the control plane parameter, or
    a computer networking layer associated with the control plane parameter.
20. The method of claim 15, where determining the third value comprises:
determining the third value based on the rule and based on a protocol associated with the control plane parameter.

* * * * *